United States Patent
Sannomiya et al.

(10) Patent No.: US 10,589,367 B2
(45) Date of Patent: Mar. 17, 2020

(54) MACHINE TOOL AND CONTROL DEVICE OF THE MACHINE TOOL

(71) Applicants: Citizen Watch Co., Ltd., Tokyo (JP); Citizen Machinery Co., Ltd., Nagano (JP)

(72) Inventors: Kazuhiko Sannomiya, Nagano (JP); Takaichi Nakaya, Nagano (JP)

(73) Assignees: Citizen Watch Co., Ltd., Tokyo (JP); Citizen Machinery Co., Ltd., Nagano (JP)

(*) Notice: Subject to any disclaimer, the term of this patent is extended or adjusted under 35 U.S.C. 154(b) by 223 days.

(21) Appl. No.: 15/517,101

(22) PCT Filed: Oct. 6, 2015

(86) PCT No.: PCT/JP2015/078262
§ 371 (c)(1),
(2) Date: Apr. 5, 2017

(87) PCT Pub. No.: WO2016/056526
PCT Pub. Date: Apr. 14, 2016

(65) Prior Publication Data
US 2017/0304920 A1    Oct. 26, 2017

(30) Foreign Application Priority Data
Oct. 8, 2014 (JP) .................... 2014-207105

(51) Int. Cl.
*G05B 19/18* (2006.01)
*B23G 3/00* (2006.01)
(Continued)

(52) U.S. Cl.
CPC ............. *B23G 3/00* (2013.01); *B23B 25/02* (2013.01); *B23G 1/04* (2013.01); *B23Q 15/12* (2013.01);
(Continued)

(58) Field of Classification Search
CPC ........... B23B 29/125; B23G 3/00; B24B 1/04; Y10T 82/20; Y10S 82/904
(Continued)

(56) References Cited

U.S. PATENT DOCUMENTS 3,174,404 A     3/1965  Findley
4,419,912 A  *  12/1983  Sotome ................. B23B 29/125
                                                                 82/11.1
(Continued)

FOREIGN PATENT DOCUMENTS

JP    10-124127 A    5/1998
JP    2001-150201 A  6/2001
JP    2006-312223 A  11/2006

OTHER PUBLICATIONS

Sannomiya et al., U.S. Appl. No. 15/129,238, filed Sep. 26, 2016 on Control Device for Machine Tool Including the Control Device.
(Continued)

*Primary Examiner* — Alan Snyder
(74) *Attorney, Agent, or Firm* — Howson & Howson LLP

(57) ABSTRACT

A machine forms threads on a workpiece by relatively feeding the workpiece and a cutting tool in a feeding direction while relatively rotating the workpiece and the cutting tool, and by performing a helical cutting work multiple times while carrying out relative reciprocal vibration of the workpiece and the cutting tool in a radial direction of the workpiece. The machine tool or a control device of the machine tool includes a vibration setting unit to set a pattern of vibration during each cutting work accompanied by the reciprocal vibration so that a cut portion of one cutting work partially includes a portion that has been cut in another cutting work. The machine tool and the control device prevent a long, continuous chip from becom-
(Continued)

ing entangled with a workpiece or a cutting tool in the process of forming threads on the workpiece.

5 Claims, 5 Drawing Sheets

(51) Int. Cl.
    *B23Q 15/12*     (2006.01)
    *G05B 19/4093*     (2006.01)
    *B23B 25/02*     (2006.01)
    *B23G 1/04*     (2006.01)

(52) U.S. Cl.
    CPC ....... *G05B 19/186* (2013.01); *G05B 19/4093* (2013.01); *B23B 2260/0625* (2013.01); *G05B 2219/36198* (2013.01); *G05B 2219/37435* (2013.01)

(58) Field of Classification Search
    IPC ............ B23B 29/125; B23G 3/00; B24B 1/04; Y10T 82/20; Y10S 82/904
    See application file for complete search history.

(56) References Cited

U.S. PATENT DOCUMENTS

| | | | |
|---|---|---|---|
| 4,496,321 A * | 1/1985 | Kumabe | B23Q 11/0039 433/119 |
| 4,640,156 A | 2/1987 | Nakagawa et al. | |
| 4,667,546 A | 5/1987 | Dombrowski et al. | |
| 4,911,044 A * | 3/1990 | Mishiro | B23B 29/125 82/158 |
| 5,035,142 A * | 7/1991 | Dryga | G01N 29/12 148/509 |
| 5,076,744 A | 12/1991 | Kitagawa et al. | |
| 6,349,600 B1 * | 2/2002 | Davies | B23Q 17/0976 73/104 |
| 2006/0099039 A1 * | 5/2006 | Maki | B23B 29/125 408/1 R |
| 2007/0052326 A1 * | 3/2007 | Liu | B23B 29/125 310/323.18 |
| 2008/0232916 A1 | 9/2008 | Schiemann | |
| 2008/0238255 A1 * | 10/2008 | Lee | B23B 29/125 310/323.18 |
| 2014/0121816 A1 * | 5/2014 | Nishimura | B23G 3/00 700/159 |
| 2014/0216216 A1 * | 8/2014 | Hessenkamper | B23B 29/125 82/1.11 |
| 2018/0036807 A1 * | 2/2018 | Ketelaer | B23B 29/125 |
| 2018/0335765 A1 * | 11/2018 | Tezuka | G05B 19/404 |

OTHER PUBLICATIONS

Kitakaze et al., U.S. Appl. No. 15/129,242, filed Sep. 26, 2016 on Control Device for Machine Tool and Machine Tool Including the Control Device.

Sannomiya et al., U.S. Appl. No. 15/506,793, filed Feb. 27, 2017 on Machine Tool and Control Apparatus of the Machine Tool.

Sannomiya et al., U.S. Appl. No. 15/512,989, filed Mar. 21, 2017 on Machine Tool and Control Apparatus of the Machine Tool.

* cited by examiner

MACHINE TOOL AND CONTROL DEVICE OF THE MACHINE TOOL

CROSS-REFERENCE TO RELATED APPLICATIONS

This application is a national phase application under 35 USC § 371, based upon International Application PCT/JP2015/078262, the entire disclosure of which is here incorporated by reference.

FIELD OF THE INVENTION

The present invention relates to a machine tool that performs a threading work on a workpiece, and also relates to a control device of the machine tool.

BACKGROUND OF THE INVENTION

A conventional machine tool for cutting a workpiece includes a workpiece holding unit to hold a workpiece, a tool rest to hold a cutting blade that serves as a cutting tool for cutting the workpiece, a feeding unit to feed the cutting tool toward the workpiece in a predetermined feeding direction via relative movement between the workpiece holding unit and the tool rest, an actuator that serves as a vibration unit to effect relative reciprocal vibration of the workpiece holding unit and the tool rest in a radial direction of the workpiece, and a spindle that serves as a rotating unit to relatively rotate the workpiece and the cutting tool. The machine tool cuts the workpiece by feeding the spindle and the cutting blade in the radial direction of the workpiece while reciprocally vibrating the cutting blade as shown for example in FIG. 2 of Laid-Open Japanese Patent Application No. 2001-150201.

This cutting apparatus machines a workpiece while separating a chip generated in a cutting work by feeding the cutting blade in the radial direction of the workpiece toward the center of rotation of the workpiece so that a portion of a path traced by the cutting blade when the cutting blade is fed farthest in a feeding direction during one rotation of the workpiece overlaps a portion of a path traced by the cutting blade when the cutting blade is fed least in the feeding direction during the next rotation of the workpiece.

SUMMARY OF THE INVENTION

The above conventional cutting apparatus, however, is limited to the case where a phase of vibration waveform of the cutting blade during one rotation of the workpiece is reversed with respect to a phase of vibration waveform of the cutting blade during the next rotation of the workpiece, and is not applicable to the formation of threads on a workpiece by performing multiple helical cutting works on the workpiece Thus an object of the present invention is to address the above problem, and to provide a machine tool that is capable of performing a threading work while separating a chip, and a control device of the machine tool.

According to a first aspect of the invention, the above problem is addressed by a machine tool including a workpiece holding unit to hold a workpiece, a tool rest to hold a cutting tool for cutting the workpiece, a feeding unit to feed the cutting tool toward the workpiece in a predetermined feeding direction via relative movement between the workpiece holding unit and the tool rest, a vibration unit to reciprocally vibrate the workpiece holding unit and the tool rest in a relative manner in a radial direction of the workpiece, and a rotating unit to relatively rotate the workpiece and the cutting tool. The machine tool is capable of performing a threading work that forms a screw part on the workpiece by relatively feeding the workpiece and the cutting tool in the feeding direction while relatively rotating the workpiece and the cutting tool and by performing a cutting work for multiple times along one cutting path having a predetermined helical shape. The vibration unit performs the reciprocal vibration of the workpiece holding unit and the tool rest while a cutting work is performed for predetermined multiple times. The machine tool includes a vibration setting unit to set a pattern of vibration during each cutting work accompanied by the reciprocal vibration so that a cut portion of one cutting work partially includes a portion that has been cut in another cutting work.

According to a second aspect of the invention, the vibration setting unit is configured to change a phase of the vibration with respect to rotation of the workpiece.

According to a third aspect of the invention, the vibration setting unit is configured to change a frequency of the vibration.

According to a fourth aspect of the invention, the vibration setting unit is configured to set an amplitude of the reciprocal vibration in accordance with a cutting amount of each cutting work.

According to a fifth aspect of the invention, the above problem is addressed by a control device provided in a machine tool including a workpiece holding unit to hold a workpiece, a tool rest to hold a cutting tool for cutting the workpiece, a feeding unit to feed the cutting tool toward the workpiece in a predetermined feeding direction via relative movement between the workpiece holding unit and the tool rest, a vibration unit to reciprocally vibrate the workpiece holding unit and the tool rest in a relative manner in a radial direction of the workpiece, and a rotating unit to relatively rotate the workpiece and the cutting tool. The machine tool is capable of performing a threading work that forms a screw part on the workpiece by relatively feeding the workpiece and the cutting tool in the feeding direction while relatively rotating the workpiece and the cutting tool and by performing a cutting work for multiple times along one cutting path having a predetermined helical shape. The control device is configured to set a pattern of vibration during each cutting work accompanied by the reciprocal vibration so that a cut portion of one cutting work partially includes a portion that has been cut in another cutting work and to make the vibration unit perform the reciprocal vibration of the workpiece holding unit and the tool rest while a cutting work is performed for predetermined multiple times.

According to the first aspect of the invention, because a cut portion of one cutting work partially includes a portion that has been cut in another cutting work while a cutting work accompanied by the reciprocal vibration is performed for multiple times in a threading work, a chip generated in a cutting work is separated. Thus, it is possible to prevent a long, continuous chip from getting entangled with the workpiece or the cutting tool while the threading work is performed on the workpiece and to avoid damaging a machined surface of the workpiece.

According to the second aspect of the invention, a phase of the vibration of a current cutting work can be changed with respect to a phase of the vibration of a previous cutting work so that a cut portion of the current cutting work partially include a portion that has been cut in the previous cutting work. Thus, it is possible to easily separate a chip generated in a cutting work.

According to the machine tool of the invention, an amplitude of the vibration of a current cutting work can be changed with respect to an amplitude of the vibration of a previous cutting work so that a cut portion of the current cutting work partially include a portion that has been cut in the previous cutting work. Thus, it is possible to easily separate a chip generated in a cutting work.

According to the fourth aspect of the invention, an amplitude of the reciprocal vibration can be set to an appropriate amplitude amount in accordance with a cutting amount of each cutting work so that a cut portion of a current cutting work partially include a portion that has been cut in a previous cutting work. Thus, it is possible to easily separate a chip generated in a cutting work.

According to the fifth aspect of the invention, the same effects achieved by the first aspect of the present invention can also be achieved by the control device of the machine tool.

DETAILED DESCRIPTION OF THE PREFERRED EMBODIMENTS

A machine tool and a control apparatus of the machine tool according to an aspect of the present invention may be embodied in any manner as long as the machine tool includes a workpiece holding unit to hold a workpiece, a tool rest to hold a cutting tool for cutting the workpiece, a feeding unit to feed the cutting tool toward the workpiece in a predetermined feeding direction via relative movement between the workpiece holding unit and the tool rest, a vibration unit to reciprocally vibrate the workpiece holding unit and the tool rest in a relative manner in a radial direction of the workpiece, and a rotating unit to relatively rotate the workpiece and the cutting tool, the machine tool being capable of performing a threading work that forms a screw part on the workpiece by relatively feeding the workpiece and the cutting tool in the feeding direction while relatively rotating the workpiece and the cutting tool and by performing a cutting work for multiple times along one cutting path having a predetermined helical shape, wherein the vibration unit performs the reciprocal vibration of the workpiece holding unit and the tool rest while a cutting work is performed for predetermined multiple times, and the machine tool includes a vibration setting unit to set a pattern of vibration during each cutting work accompanied by the reciprocal vibration so that a cut portion of one cutting work partially includes a portion that has been cut in another cutting work, so as to separate a chip generated in a cutting work for preventing a long, continuous chip from getting entangled with the workpiece or the cutting tool while the threading work is performed on the workpiece and to avoid damaging a machined surface of the workpiece.

Figure 1:
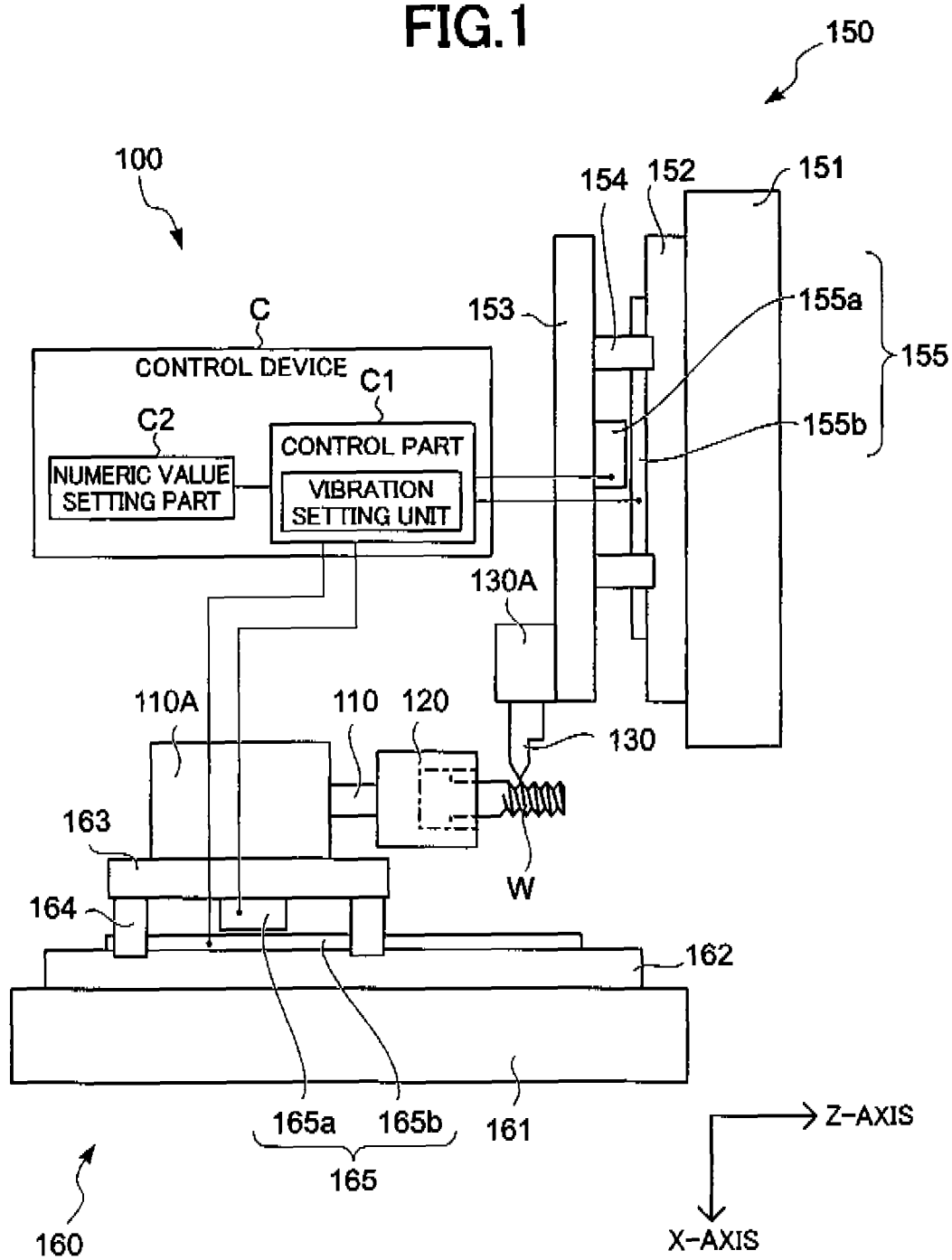
FIG. 1 is a schematic diagram illustrating a machine tool of a first embodiment of the present invention.

FIG. 1 is a diagram illustrating a machine tool 100 having a control device C as the first embodiment of the present invention. The machine tool 100 includes a spindle 110 and a cutting tool rest 130A. The spindle 110 has a chuck 120 provided at a tip thereof. A workpiece W is held by the spindle 110 via the chuck 120, and the spindle 110 is configured as a workpiece holding unit to hold a workpiece. The spindle 110 is supported by a spindle stock 110A so as to be rotatably driven by a spindle motor that is not illustrated. A conventional built-in motor or the like formed between the spindle stock 110A and the spindle 110 may be used as the spindle motor in the spindle stock 110A.

The spindle stock 110A is mounted on a bed side of the machine tool 100 so as to be movable in a Z-axis direction, which is an axis direction of the spindle 110, by a Z-axis direction feeding mechanism 160. The spindle 110 moves in the Z-axis direction by the Z-axis direction feeding mechanism 160 via the spindle stock 110A. The Z-axis direction feeding mechanism 160 constitutes a spindle moving mechanism for moving the spindle 110 in the Z-axis direction.

The Z-axis direction feeding mechanism 160 includes a base 161, which is integral with a side on which the Z-axis direction feeding mechanism 160 is fixed, such as the bed side, and a Z-axis direction guide rail 162 provided on the base 161 so as to extend in the Z-axis direction. A Z-axis direction feeding table 163 is slidably supported on the Z-axis direction guide rail 162 via a Z-axis direction guide 164. A mover 165a of a linear servo motor 165 is provided on the side of the Z-axis direction feeding table 163, and a stator 165b of the linear servo motor 165 is provided on the side of the base 161.

The spindle stock 110A is mounted on the Z-axis direction feeding table 163, and the Z-axis direction feeding table 163 is driven by the linear servo motor 165 to move in the Z-axis direction. Due to the movement of the Z-axis direction feeding table 163, the spindle stock 110A moves in the Z-axis direction, making the spindle 110 move in the Z-axis direction.

A cutting tool 130, such as a bite, for cutting the workpiece W is attached to the cutting tool rest 130A. The cutting tool rest 130A constitutes a tool rest that holds the cutting tool 130. The cutting tool rest 130A is provided on a bed side of the machine tool 100 so as to be movable in an X-axis direction, which is perpendicular to the Z-axis direction, and in a Y-axis direction, which is perpendicular to both the Z-axis direction and the X-axis direction, by an X-axis direction feeding mechanism 150 and a Y-axis direction feeding mechanism that is not illustrated. The X-axis direction feeding mechanism 150 and the Y-axis direction feeding mechanism constitute a tool rest moving mechanism for moving the cutting tool rest 130A in the X-axis direction and the Y-axis direction with respect to the spindle 110.

The X-axis direction feeding mechanism 150 includes a base 151, which is integral with a side on which the X-axis direction feeding mechanism 150 is fixed, and an X-axis direction guide rail 152 provided on the base 151 so as to extend in the X-axis direction. An X-axis direction feeding table 153 is slidably supported on the X-axis direction guide rail 152 via an X-axis direction guide 154.

A mover 155a of a linear servo motor 155 is provided on the side of the X-axis direction feeding table 153, and a stator 155b of the linear servo motor 155 is provided on the side of the base 151. The X-axis direction feeding table 153 is driven by the linear servo motor 155 to move in the X-axis direction. The Y-axis direction feeding mechanism is structurally similar to the X-axis direction feeding mechanism 150, except being arranged in the Y-axis direction. Thus, the detailed description and illustration of the Y-axis direction feeding mechanism are omitted.

In FIG. 1, the X-axis direction feeding mechanism 150 is mounted on the bed side via the Y-axis direction feeding mechanism that is not illustrated, and the cutting tool rest 130A is mounted on the X-axis direction feeding table 153. The cutting tool rest 130A moves in the X-axis direction by being driven by the X-axis direction feeding table 153, and also moves in the Y-axis direction by being driven by the Y-axis direction feeding mechanism, which operates similarly to the X-axis direction feeding mechanism 150.

Alternatively, the Y-axis direction feeding mechanism that is not illustrated may be mounted on the bed side via the X-axis direction feeding mechanism 150, and the cutting tool rest 130A may be mounted on the side of the Y-axis direction feeding mechanism. The structure for moving the cutting tool rest 130A in the X-axis direction and the Y-axis direction by the X-axis direction feeding mechanism and the Y-axis direction feeding mechanism 150 is conventionally known and thus the detailed description and illustration of the structure are omitted.

The tool rest moving mechanism (the X-axis direction feeding mechanism 150 and the Y-axis direction feeding mechanism) and the spindle moving mechanism (the Z-axis direction feeding mechanism 160) operate cooperatively, and the cutting tool 130 attached to the cutting tool rest 130A is fed in any feeding direction with respect to the workpiece W via the movement of the cutting tool rest 130A in the X-axis direction and the Y-axis direction by the X-axis direction feeding mechanism 150 and the Y-axis direction feeding mechanism as well as via the movement of the spindle stock 110A (the spindle 110) in the Z-axis direction by the Z-axis direction feeding mechanism 160.

Figure 2:
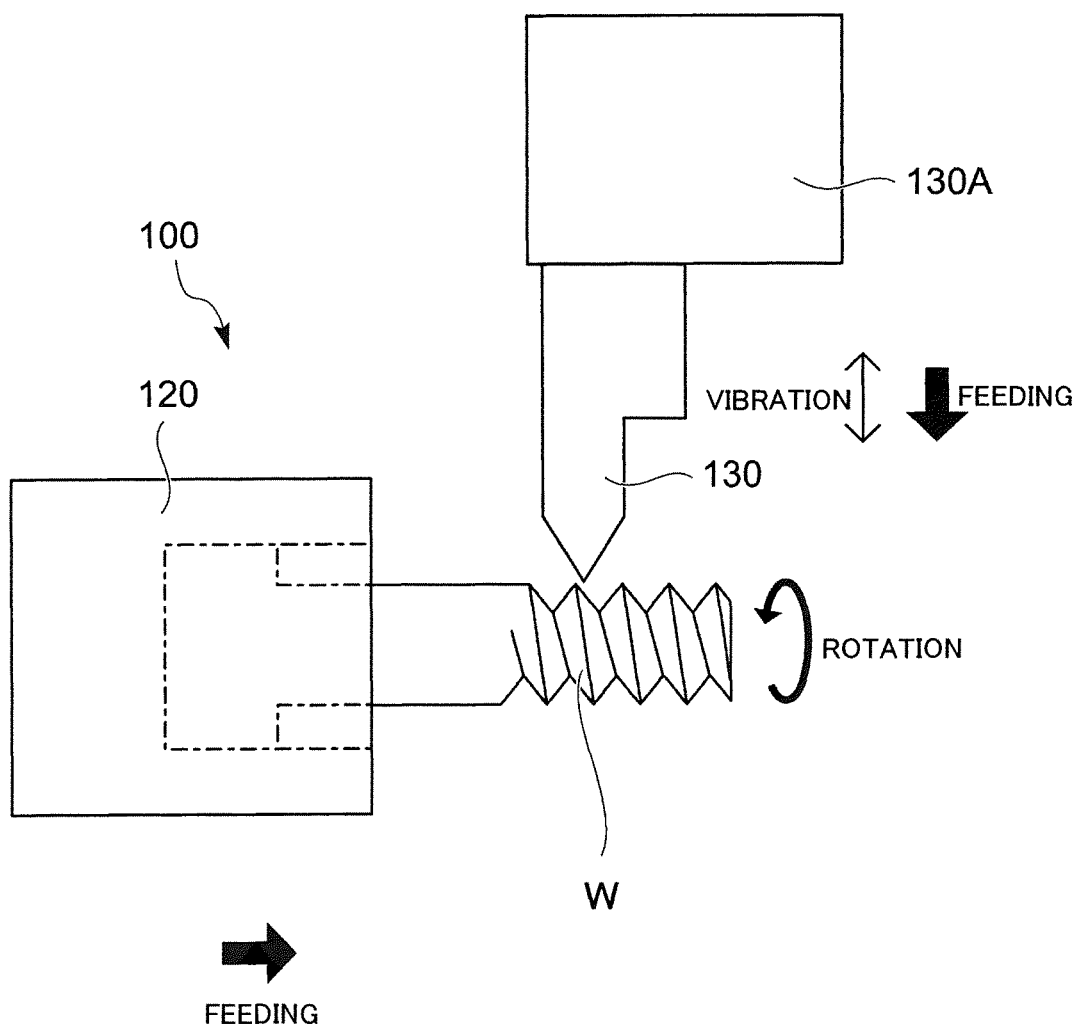
FIG. 2 is a schematic diagram illustrating the relationship between a cutting tool and a workpiece in the first embodiment of the present invention.

A threading work is performed by relatively feeding the cutting tool 130 with respect to the workpiece W in any feeding direction via a feeding unit consisting of the spindle moving mechanism (the Z-axis direction feeding mechanism 160) and the tool rest moving mechanism (the X-axis direction feeding mechanism 150 and the Y-axis direction feeding mechanism) while reciprocally vibrating the cutting tool 130 in a relative manner with respect to the workpiece W in a radial direction of the workpiece W intersecting with the feeding direction via a vibration unit consisting of the spindle moving mechanism and the tool rest moving mechanism to perform a cutting work for multiple times in a helical manner. Due to this, a screw part can be created on the workpiece W, as illustrated in FIG. 2.

In this embodiment, both the spindle stock 110A and the cutting tool rest 130A are movable. Alternatively, the spindle stock 110A may be fixed on the bed side of the machine tool 100 and the tool rest moving mechanism may be configured to move the cutting tool rest 130A in the X-axis direction, the Y-axis direction, and the Z-axis direction. In the latter case, the feeding unit and the vibration unit may be consist of the tool rest moving mechanism that moves the cutting tool rest 130A in the X-axis direction, the Y-axis direction, and the Z-axis direction, and the cutting tool 130 may be fed toward the workpiece W and reciprocally vibrated by moving the cutting tool rest 130A with respect to the spindle 110 that is fixedly positioned and rotatably driven.

Also, the cutting tool rest 130A may be fixed on the bed side of the machine tool 100 so as to be not movable and the spindle moving mechanism may be configured so as to move the spindle stock 110A in the X-axis direction, the Y-axis direction, and the Z-axis direction. In this case, the feeding unit and the vibration unit may be consist of the spindle moving mechanism that moves the spindle stock 110A in the X-axis direction, the Y-axis direction, and the Z-axis direction, and the cutting tool 130 may be fed toward the workpiece W and reciprocally vibrated by moving the spindle stock 110A with respect to the cutting tool rest 130A that is fixedly positioned.

Although the X-axis direction feeding mechanism 150, the Y-axis direction feeding mechanism, and the Z-axis direction feeding mechanism 160 are configured to be driven by a linear servo motor in this embodiment, they may be driven by a conventional mechanism consisting of a ball screw and a servo motor, for example.

In this embodiment, a rotating unit to relatively rotate the workpiece W and the cutting tool 130 consists of the spindle motor such as the built-in motor, and the relative rotation between the workpiece W and the cutting tool 130 is achieved by rotatably driving the spindle 110. Although the present embodiment is configured so that the workpiece W is rotated with respect to the cutting tool 130, the cutting tool 130 may be rotated with respect to the workpiece W.

The rotation of the spindle 110, the Z-axis direction feeding mechanism 160, the X-axis direction feeding mechanism 150, and the Y-axis direction feeding mechanism are driven and controlled by a control part C1 of the control device C. The control part C1 is preconfigured to control so that the spindle stock 110A or the cutting tool rest 130A moves in any one of the X-axis direction, the Y-axis direction, and the Z-axis direction while reciprocally vibrating in any one of the X-axis direction, the Y-axis direction, and the Z-axis direction by utilizing one of the feeding mechanisms as a vibration unit.

Figure 3:
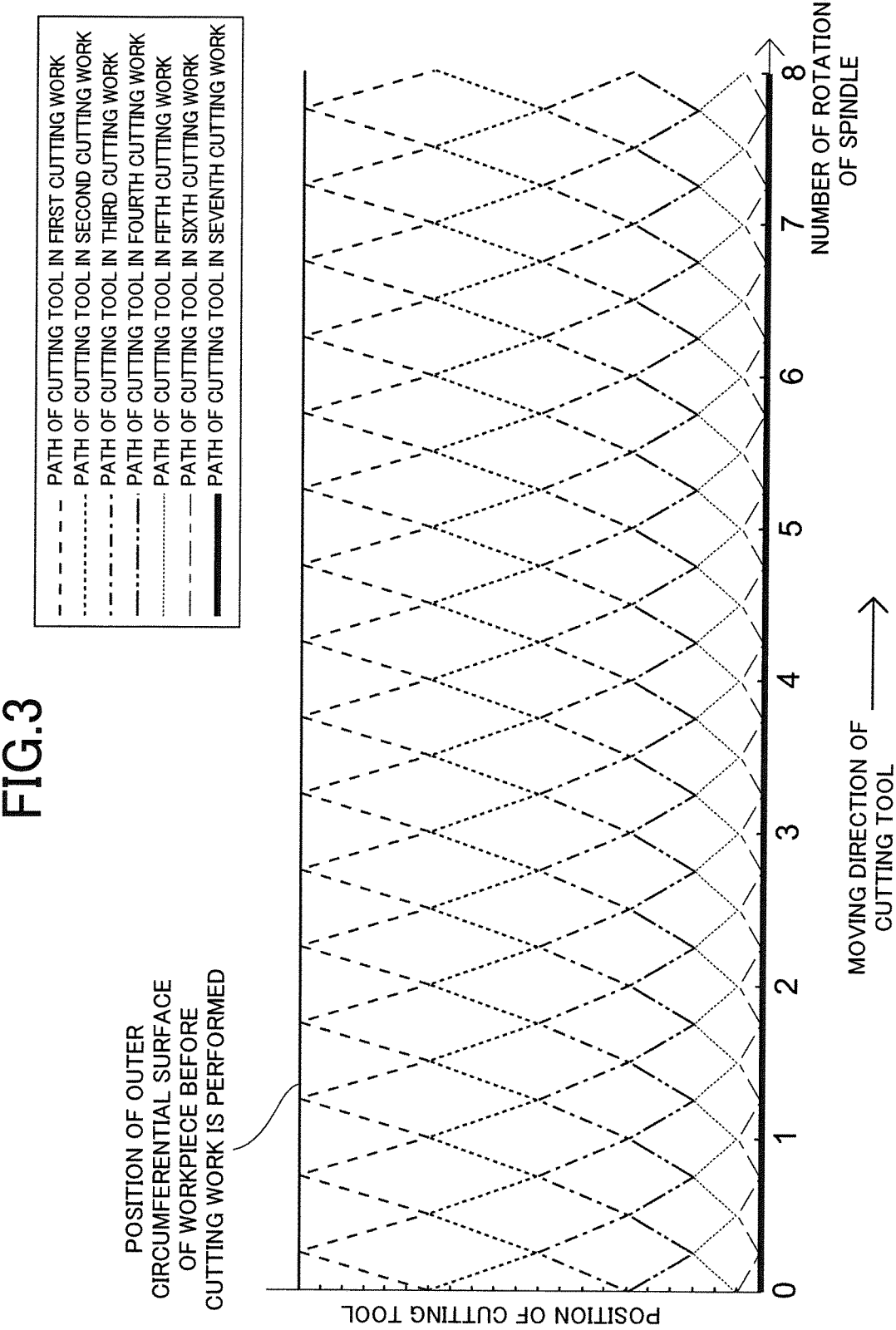
FIG. 3 is an expanded schematic diagram illustrating the position of the cutting tool with respect to the workpiece in the first embodiment of the present invention.
Figure 4:
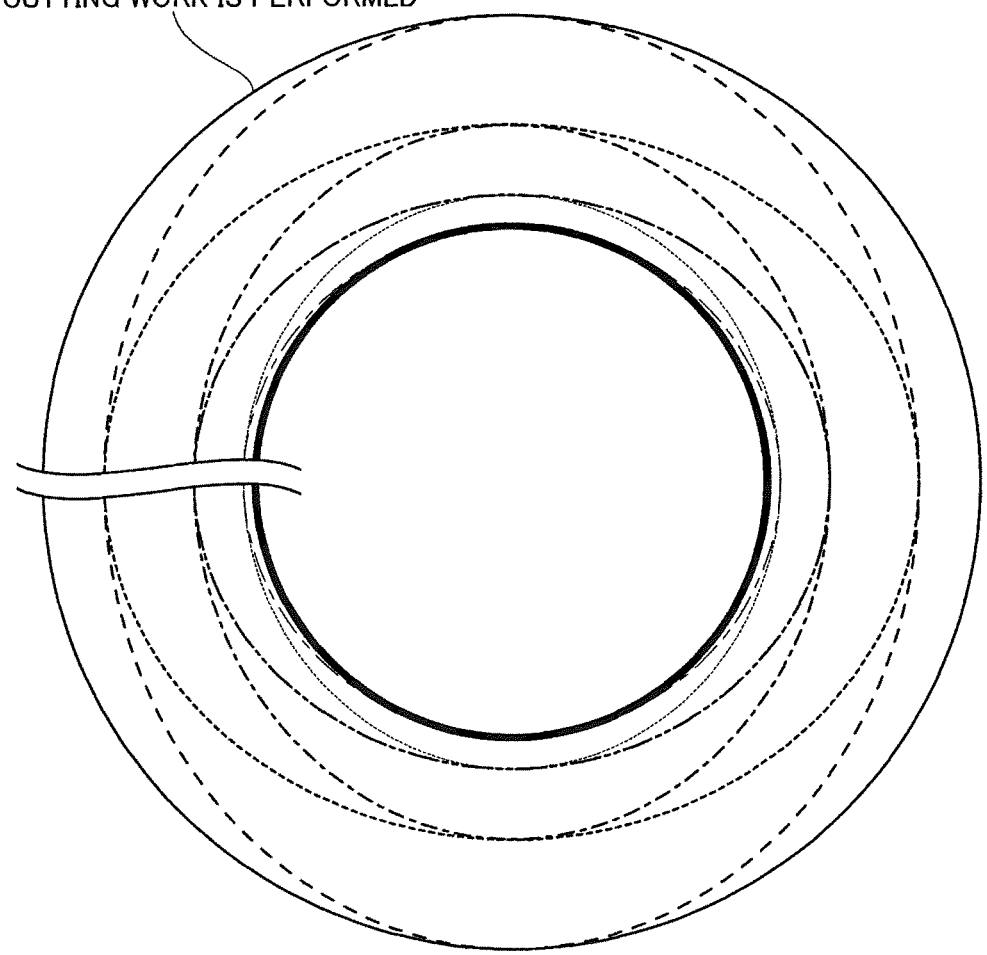
FIG. 4 is a schematic diagram illustrating paths traced by the cutting tool in one thread on the workpiece as seen in a Z-axis direction.

As illustrated in FIGS. 3 and 4, due to the control of the control part C1, each feeding mechanism is controlled so as to perform a threading work by performing a cutting work for seven times in a helical manner, for example. The number of cutting works indicates how many times a cutting work is performed in one threading work. For the sake of clarity, vibrations of the cutting tool 130 are linearly illustrated in FIG. 3.

The control part C1 works as a control unit for making a path traced by the cutting tool in the backward movement of the n+1th cutting work (n is an integer equal to or larger than one) reach a path traced by the cutting tool in the nth cutting work. The control part C1 also works as a vibration setting unit for setting a pattern of vibration during each cutting work accompanied by the reciprocal vibration so that a cut portion of the n+1th cutting work partially includes a portion that has been cut in the nth cutting work by changing a phase of vibration between the n+1th cutting work and the nth cutting work.

During the first to sixth cutting works, the number of vibrations by the vibration unit is constant. For example, the cutting tool 130 vibrates twice in the X-axis direction with respect to one rotation of the workpiece. According to the present embodiment, in the first cutting work, the cutting tool 130 vibrates so that the cutting work starts at the beginning of the backward movement of the reciprocal vibration and a tip of the cutting tool 130 reaches an outer circumferential surface of the workpiece W in the backward movement of the reciprocal vibration. A chip is separated when the tip of the cutting tool 130 reaches the outer circumferential surface of the workpiece W.

In the second cutting work, the control part C1 changes the phase of the second cutting work with respect to the phase of the first cutting work and controls the path traced by the cutting tool 130 in the backward movement of the second cutting work so as to reach the path traced by the cutting tool 130 in the first cutting work.

In the present embodiment, specifically, the phase of the reciprocal vibration of the second (n+1th: n is an integer equal to or larger than one) cutting work is set to be opposite to the phase of the reciprocal vibration of the first (nth) cutting work so that the second cutting work starts from the beginning of the reciprocal vibration, and the path traced by the cutting tool 130 in the backward movement of the second cutting work is controlled so as to reach the path traced by the cutting tool 130 in the first cutting work as the forward movement switches to the backward movement.

When the path traced by the cutting tool 130 in the backward movement of the second cutting work reaches the path traced by the cutting tool 130 in the first cutting work as the forward movement switches to the backward movement, a chip is separated. In other words, due to the control of the control part C1, a cut portion of backward movement of the second cutting work comes into contact with a cut portion of the forward movement of the first cutting work.

Because the cut portion of backward movement of the second cutting work comes into contact with the cut portion of the forward movement of the first cutting work, the cut portion of backward movement of the second cutting work is theoretically included in the cut portion of the forward movement of the first cutting work as a "point", where the cutting tool 130 performs an air cut, in which the cutting tool 130 does not cut the workpiece W at all. Thus, a chip generated from the workpiece W during a cutting work is sequentially separated by the air cut (the point where the cut portion of the backward movement of the second cutting work comes into contact with the cut portion of the forward movement of the first cutting work). The third and fourth cutting works and the fifth and sixth cutting works are performed in a relationship similar to the relationship between the first and second cutting works.

The cut portions of two consecutive cutting works come in contact with each other when the amplitude of the reciprocal vibration is coincide with the cutting amount of the cutting work. Because the cutting amount of each cutting work decreases in one threading work, the amplitude of the reciprocal vibration is controlled so as to be smaller as the number of cutting works increases. Due to this, the roughness of a bottom surface of a thread on the workpiece W gradually becomes smaller as the number of cutting works increases. In the last, or seventh, cutting work, the bottom surface of the thread on the workpiece W can be further flattened by cutting the bottom surface with the cutting tool 130 without vibrating the cutting tool 130.

FIG. 4 is a schematic diagram illustrating the paths traced by the cutting tool 130 in one thread illustrated in FIG. 3 as seen in the Z-axis direction of the workpiece W. As illustrated in FIG. 4, because the cutting condition illustrated in FIG. 3 is adapted such that the number of vibrations of the cutting tool 130 is two with respect to one rotation of the spindle, the workpiece W has an oval shape when observed in the Z-axis direction, and two air cuts occurs with respect to the perimeter of the workpiece W (one rotation of the workpiece W). And as the number of cutting works increases, the area remained in one cutting work along the long diameter direction of the oval shape is cut in the next cutting work which is performed with a smaller amplitude. Thus, a thread is gradually formed while a machined surface becomes more flat.

The machine tool 100 of the present embodiment is configured such that a user sets the number of rotations of the spindle 110, the number of vibrations of the cutting tool 130 with respect to one rotation of the spindle, and the like to the control part C1 via a numeric value setting part C2, for example.

The settings to the control part C1 such as the number of rotations and the number of vibrations can be input to the control part C1 as a parameter. Alternatively, the number of rotations, the number of vibrations, the amplitude, and the number of cutting works, for example, can be set by writing them in a machining program or passing them as an argument in a program block (one line of a program).

Also, in the present embodiment, the path traced by the cutting tool 130 in the backward movement of the n+1th cutting work reaches the path traced by the cutting tool 130 in the nth cutting work as the forward movement switches the backward movement, so that the cut portion of the backward movement of the n+1th cutting work theoretically comes into contact with the cut portion of the forward movement of the nth cutting work at a "point". However, the cut portion of the backward movement of the n+1th cutting work may exceed the cut portion of the forward movement of the nth cutting work, as long as the path traced by the cutting tool 130 in the backward movement of the n+1th cutting work reaches the path traced by the cutting tool 130 in the nth cutting work as the forward movement switches the backward movement. In other words, the control part C1 may control so that the cut portion of the backward movement of the n+1th cutting work overlaps with the cut portion of the forward movement of the nth cutting work. In short, it is enough that the cut portion of the n+1th cutting work partially includes a portion that has been cut in the nth cutting work.

The amplitude can be set as a ratio with respect to an actual cutting amount of the cutting tool on a workpiece (amplitude-to-cutting amount ratio), for example. Although in the present embodiment the amplitude is set equal to the cutting amount, the amplitude may be set larger than the cutting amount. For example, by setting the amplitude-to-cutting amount ratio to larger than one, it is possible to set the amplitude larger than the cutting amount and to make the path traced by the cutting tool 130 in the backward movement of the n+1th cutting work exceed the path traced by the cutting tool 130 in the nth cutting work as the forward movement switches to the backward movement.

However, because the cutting amount of each cutting work gradually decreases in one threading work, the amplitude of the reciprocal vibration becomes smaller as the number of cutting works increases. Thus, the amount that the path traced by the cutting tool 130 in the backward movement of the n+1th cutting work exceeds the path traced by the cutting tool 130 in the nth cutting work as the forward movement switches to the backward movement gradually decreases. For this reason, the amount that the path traced by the cutting tool 130 in the backward movement of the n+1th cutting work exceeds the path traced by the cutting tool 130 in the nth cutting work as the forward movement switches to the backward movement may be preliminarily set as a guaranteed amplitude amount.

Thus, when the amount that the path traced by the cutting tool 130 in the backward movement of the n+1th cutting work exceeds the path traced by the cutting tool 130 in the nth cutting work as the forward movement switches to the backward movement is smaller than the guaranteed amplitude amount under the amplitude specified as the amplitude-to-cutting amount ratio, then the amplitude may be set to a value calculated by adding the guaranteed amplitude amount to the cutting amount.

As with the number of rotations and the number of vibrations of the spindle 110, the amplitude-to-cutting amount ratio and the guaranteed amplitude amount can be input to the control part C1 as a parameter, or they can be set by writing them in a machining program or passing them as an argument in a program block (one line of a program).

For example, if the control part C1 is configured such that the start of a threading work (start of vibration), in which the cutting tool 130 reciprocally vibrates in a direction intersecting the feeding direction in a relative manner with respect to the workpiece W to perform multiple cutting works in a helical manner, is instructed in a machining program with a command G*P3, then the number of vibrations N can be set to the control part C1 as a value succeeding D (argument D), the amplitude-to-cutting amount ratio can be set to the control part C1 as a value succeeding Q (argument Q), and the guaranteed amplitude amount can be set to the control part C1 as a value succeeding U (argument U) in the command G*. The number of vibrations N may be set as the number of rotations of the spindle 110 with respect to one vibration. For example, the number of rotations of the spindle 110 with respect to one vibration can be set to the control as a value succeeding E (argument E).

If the amplitude-to-cutting amount ratio is set to "1.2", then "Q1.2" is added to the command G*. If the guaranteed amplitude amount is set to "0.02 mm", then "U0.02" is added to the command G*. If the number of vibrations is set to "1", then "D1" is added to the command G***. By doing so, the amplitude-to-cutting amount ratio, the guaranteed amplitude amount, and the number of vibrations N can be set to the control part C1.

In a similar manner, until what number of cutting work the vibration should continue in one threading work and from what number of cutting work the vibration should start in one threading work may be input and set, for example. For example, until what number of cutting work the vibration should continue may be set to the control part C1 as a value succeeding K (argument K). When the argument K is used, the diameter of the workpiece W is preferably set to the control part C1. The diameter of the workpiece W can be set to the control part C1 as a value succeeding X (argument X), for example.

The machine tool 100 and the control apparatus C of the machine tool 100 as the first embodiment of the present invention obtained as described above includes the control part C1 as a vibration setting unit to set a pattern of vibration during each cutting work accompanied by the reciprocal vibration so that a cut portion of the n+1th cutting work partially includes a portion that has been cut in the nth cutting work. Thus, during a cutting work on the workpiece W, a chip is separated at the overlapping portion. Therefore, it is possible to prevent a long, continuous chip from getting entangled with the workpiece W or the cutting tool 130 and to avoid damaging a machined surface of the workpiece W.

Also, in the first embodiment, the frequency of the reciprocal vibration is constant, the phase of the reciprocal vibration of the n+1th cutting work is opposite to the phase of the reciprocal vibration of the nth cutting work, and the control part C1 makes the path traced by the cutting tool 130 in the backward movement of the n+1th cutting work reach the path traced by the cutting tool 130 in the nth cutting work as the forward movement switches to the backward movement. Thus, it is possible to perform a threading work while efficiently separating a chip.

Figure 5:
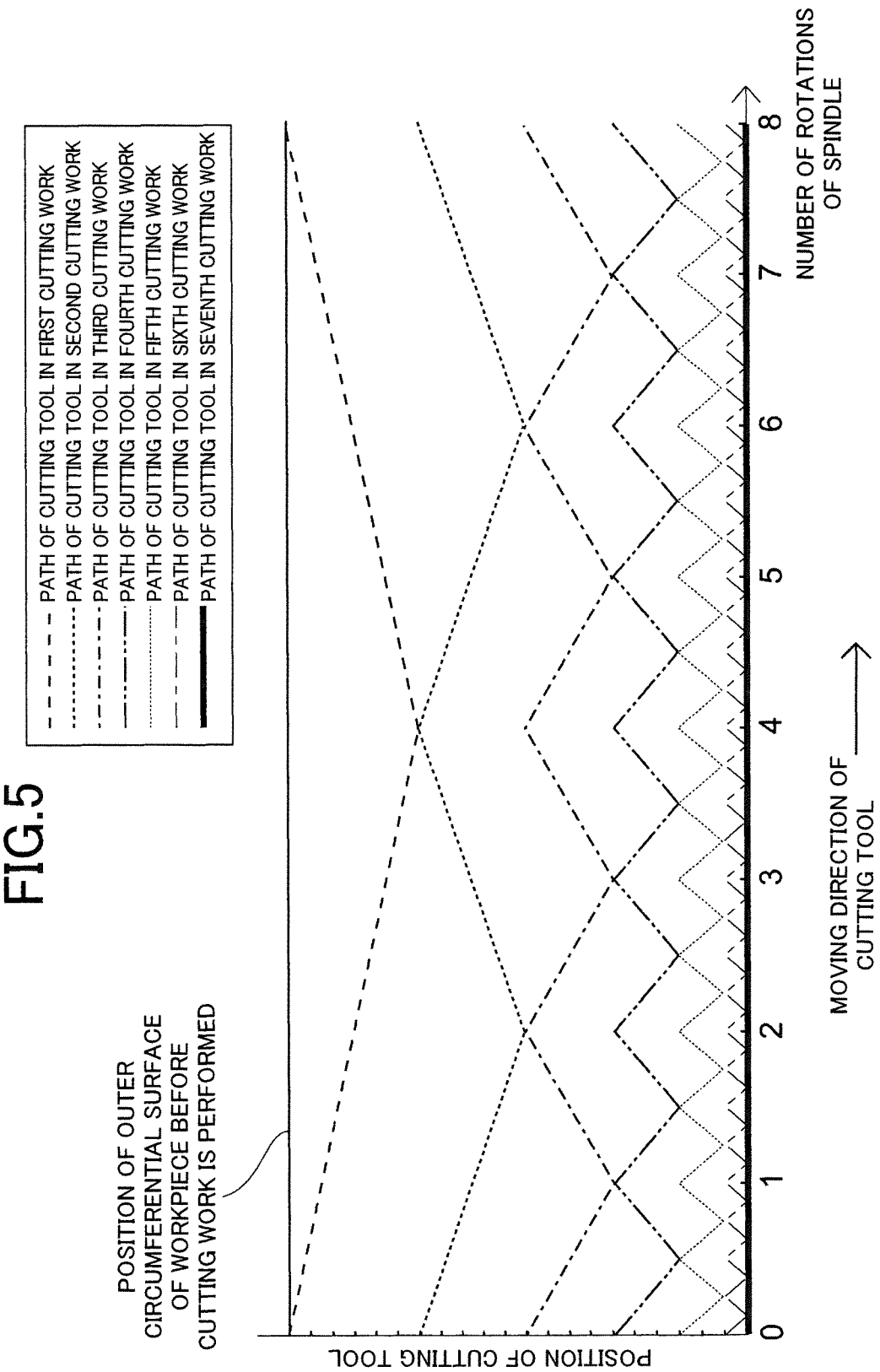
FIG. 5 is an expanded schematic diagram illustrating the position of the cutting tool with respect to the workpiece in a second embodiment of the present invention.

A second embodiment of the present invention will now be described. The description will be focused on configurations that are different from those of the first embodiment for avoiding duplication of description. As illustrated in FIG. 5, in the second embodiment, the frequency of the reciprocal vibration by the vibration unit is changed in the first to sixth cutting works.

As one example, in the first cutting work, the cutting tool 130 performs one vibration with respect to eight rotations of the spindle. In the second cutting work, the cutting tool 130 performs one vibration with respect to four rotations of the spindle. In the third cutting work, the cutting tool 130 performs one vibration with respect to two rotations of the spindle. In the fourth cutting work, the cutting tool 130 performs one vibration with respect to one rotation of the spindle. Thus, as the number of cutting works increases, the frequency of the reciprocal vibration becomes higher. Therefore, the roughness of a bottom surface of a thread on workpiece W due to a threading work becomes smaller as the number of cutting works increases.

As with the first embodiment, the amplitude of the reciprocal vibration of a cutting work is set according to a cutting amount and becomes smaller as the number of cutting works increases. However, it is also possible to set a ratio of the amplitude with respect to a cutting amount or to set an increment of the amplitude with respect to a cutting amount so that the amplitude can take a value in accordance with the ratio or the increment.

According to the machine tool 100 and the control apparatus C of the machine tool 100 as the second embodiment of the present invention obtained as described above, the frequency of the reciprocal vibration of the n+1th cutting work is higher than the frequency of the reciprocal vibration of the nth cutting work, and the control part C1 makes the path traced by the cutting tool 130 in the backward movement of the n+1th cutting work reach the path traced by the cutting tool 130 in the nth cutting work as the forward movement switches to the backward movement once in multiple vibrations of the n+1th cutting work. Thus, it is possible to perform a threading work while efficiently separating a chip and also to gradually flatten a bottom surface of a thread as the number of cutting works increases.

The invention claimed is:

1. A machine tool comprising:
   a workpiece holding unit to hold a workpiece;
   a tool rest to hold a cutting tool for cutting the workpiece;
   a feeding unit to feed the cutting tool toward the workpiece in a predetermined feeding direction via relative movement between the workpiece holding unit and the tool rest;
   a vibration unit to reciprocally vibrate the workpiece holding unit and the tool rest in a relative manner in a radial direction of the workpiece;
   a rotating unit to relatively rotate the workpiece and the cutting tool;
   and
   a control device comprising a control part and vibration setting unit,
   the machine tool being capable of performing a threading work that forms a screw part on the workpiece by relatively feeding the workpiece and the cutting tool in the feeding direction while relatively rotating the workpiece and the cutting tool and by performing a plurality of cutting works along one cutting path having a predetermined helical shape,
   the control part being configured to cause the vibration unit to perform the reciprocal vibration of the workpiece holding unit and the tool rest while performing the plurality of cutting works, and the vibration setting unit being configured to set a pattern of vibration during each cutting work accompanied by the reciprocal vibration so that a cut portion of movement toward the workpiece of a first cutting work, among two consecutive cutting works of the plurality of cutting works of the threading work, partially includes a cut portion of movement away from the workpiece of a second cutting work.

2. The machine tool according to claim 1, wherein the vibration setting unit is configured to change a phase of the vibration with respect to rotation of the workpiece.

3. The machine tool according to claim 1, wherein the vibration setting unit is configured to change a frequency of the vibration.

4. The machine tool according to claim 1, wherein the vibration setting unit is configured to set an amplitude of the reciprocal vibration in accordance with a cutting amount of each cutting work.

5. A control device provided in a machine tool comprising:
- a workpiece holding unit to hold a workpiece;
- a tool rest to hold a cutting tool for cutting the workpiece;
- a feeding unit to feed the cutting tool toward the workpiece in a predetermined feeding direction via relative movement between the workpiece holding unit and the tool rest;
- a vibration unit to reciprocally vibrate the workpiece holding unit and the tool rest in a relative manner in a radial direction of the workpiece; and
- a rotating unit to relatively rotate the workpiece and the cutting tool, the machine tool being capable of performing a threading work that forms a screw part on the workpiece by relatively feeding the workpiece and the cutting tool in the feeding direction while relatively rotating the workpiece and the cutting tool and by performing a plurality of cutting works along one cutting path having a predetermined helical shape, wherein the control device is configured to set a pattern of vibration during each cutting work accompanied by the reciprocal vibration so that a cut portion of movement toward the work piece of a first cutting work, among two consecutive cutting works of the plurality of cutting works of the threading work, partially includes a cut portion of movement away from the workpiece of a second cutting work and to make the vibration unit perform the reciprocal vibration of the workpiece holding unit and the tool rest while performing the plurality of cutting works.

* * * * *